United States Patent [19]

Wagner et al.

[11] 4,069,315
[45] Jan. 17, 1978

[54] RECOVERY OF ZINC FROM IRON-MAKING OR STEEL-REFINING FURNACE DUST

[75] Inventors: Armand Wagner, Esch, Alzette; Robert Pixius, Dudelange; François Schon, Tetange, all of Luxembourg

[73] Assignee: Acieries Reunies de Burbach-Eich-Dudelange S.A. ARBED, Luxembourg, Luxembourg

[21] Appl. No.: 707,492

[22] Filed: July 22, 1976

[30] Foreign Application Priority Data

July 23, 1975 Luxembourg ............................ 73039

[51] Int. Cl.² .......................... C01G 9/02; C22B 7/02
[52] U.S. Cl. .................................... 423/105; 423/109; 75/25
[58] Field of Search ...................... 423/105, 109, 419; 75/25, 101 R, 120

[56] References Cited

U.S. PATENT DOCUMENTS

| 2,867,503 | 1/1959 | Roy | 423/419 |
|---|---|---|---|
| 3,149,964 | 9/1964 | Schwartz | 75/25 |
| 3,188,201 | 6/1965 | Sontheimer | 423/105 |

Primary Examiner—G. O. Peters
Assistant Examiner—Brian E. Hearn
Attorney, Agent, or Firm—Karl F. Ross

[57] ABSTRACT

The zinc-containing dust from an iron-making (blast) furnace or a steel-refining (e.g. converter) furnace is recovered and extracted with water saturated with carbon dioxide to solubilize the zinc. The zinc solubilized in the $CO_2$-saturated water is then precipitated by the elimination of carbon dioxide therefrom.

9 Claims, 2 Drawing Figures

RECOVERY OF ZINC FROM IRON-MAKING OR STEEL-REFINING FURNACE DUST

FIELD OF THE INVENTION

The present invention relates to a process for the recovery of zinc from the dusts obtained in ferrous metallurgy and, more particularly, the dusts obtained from iron-making blast furnaces or converters for the refining of steel.

BACKGROUND OF THE INVENTION

It is known that the dusts entrained with the gases of a blast furnace and from a steel-making furnace contain a large part of the zinc introduced into the bath, e.g. in the form of galvanized scrap. The dusts are particularly rich in zinc when the melt in either furnace contains large proportions of galvanized-iron or galvanized-steel scrap.

It has already been proposed to recover the zinc in the form of its oxide from such dusts by extraction of the dusts from the gas by wet or dry separation. None of these techniques have proved to be commercially successful since the zinc content of the product is insufficiently high and the recovery itself is not satisfactory.

When the dusts are returned to the furnace they have a tendency to increase the zinc content of the melt and to cause problems in the iron or steel making process.

It is known, for example, that the presence of zinc in the fusion bed of a blast furnace causes difficulties in the operation thereof, not only because of an increased consumption of coke but also because of dangers to the personnel of the plant.

It is possible to reduce the problem by reducing the input of zinc to the furnace but this requires special methods in selecting the scrap or utilizing ores which are free from zinc or contain only minor quantities thereof.

OBJECTS OF THE INVENTION

It is the principal object of the present invention to provide a process for the treatment of zinc-containing dusts obtained from ferrous metallurgical processes in a manner so as to extract the zinc and enable recycling of dusts which contain sufficient levels of iron to make recycling worthwhile.

Another object of the invention is to provide an improved process for recovering zinc from ferrous metallurgical dusts without the disadvantages enumerated above.

SUMMARY OF THE INVENTION

These objects are attained, in accordance with the present invention, by recovering a dust containing zinc from a ferrous metallurgical process, e.g. from a blast furnace or a steel-making furnace, and treating the dusts so recovered with water saturated with carbon dioxide. Thereafter, the extracting solution is treated to eliminate the carbon dioxide and thereby precipitate the zinc as the oxide.

The process is essentially based upon two key steps:

A. Firstly, a zinc compound is brought into solution from the dust with water saturated with carbon dioxide. The dust, preferably previously pelletized or compacted, is introduced into the water which has been saturated with carbon dioxide.

For the saturation of the water with carbon dioxide, we prefer to make use of the carbon dioxide present in the gases produced in the ferrous metallurgical process. Thus the water used for extraction of the dust can be previously employed to scrub the gases and thereby solubilize carbon dioxide therefrom.

It has been found to be advantageous to include in the extracting solution sulfur dioxide which itself can be recovered from the gases of the ferrous metallurgical process during the aforementioned scrubbing process. The sulfur dioxide appears to contribute to an intensification of the solubilization of the zinc oxide in the solution. It is also possible, if sulfur dioxide is not available in the gases, to add a minor quantity of a mineral acid to the wash water used to extract the dust. The mineral acid can be hydrochloric acid, nitric acid, or sulfuric acid.

The parameters which appear to affect the solubilization of the zinc oxide in the solution are temperature and pressure. Preferably a relatively low temperature is employed to enable the solution to contain a maximum amount of carbon dioxide. However, as long as carbon dioxide is present in the solution, the systems of the present invention will be effective. The effective pressure on the quantity of zinc which can be brought into solution is discussed below in connection with the drawing.

The extraction can be continuous, discontinuous or effected in a plurality of steps depending upon industrial convenience.

B. The second key step is the precipitation of the zinc solubilized in the water.

In general, any technique which results in the evolution of carbon dioxide from the extracting solution will be operative. Thus the solution can be separated from the treated solids by decantation, filtration or by centrifugation, leaving the insoluble residue which can be returned to the furnace since it contains large quantities of iron.

The evolution of carbon dioxide can be effected by aeration, i.e. introducing oxygen or air into the gas, by evacuation (i.e. subjecting the solution to a low, subatmospheric pressure), or by raising the temperature of the solution to drive the $CO_2$ therefrom.

According to the invention, the pH may be raised to a neutral or alkaline level, preferably after evolution of carbon dioxide, by the addition of an alkaline or basic substance such as quicklime, slaked lime, or sodium hydroxide.

An important advantage of the process of the present invention resides in the fact that it enables the recovered zinc to be obtained without the use of special reactants and in a form in which it can be introduced directly into a process for the recovery of zinc, namely, as the zinc oxide. Small quantities, if any, of acids or bases are necessary and the sole reactant essential to the process is the readily available carbon dioxide.

A second advantage of the present process is that the residue of the pellets or compacts of the dust contain principally iron and are able to be incorporated into the charge of the blast furnace or the melt of a steel-making furnace without increasing the zinc concentration therein. The recycled powders or dusts are disencumbered from the greatest proportion of alakli which might otherwise be present.

Furthermore, the apparatus necessary to carry out the process is relatively simple, the consumption of energy is minor, and the danger of pollution from the liquid discharged by the process and from the gases which emerge into the atmosphere are insignificant.

The process can be used also to treat dusts which are not obtained from ferrous metallurgical processes but contain even small amounts of zinc. For example, certain dust fractions recovered from the thermal preparation of zinc concentrate and the pyrometallurgical processes in the production of zinc contain sufficiently small quantities of zinc to enable them to be utilized directly in the process of the present invention.

BRIEF DESCRIPTION OF THE DRAWING

The above and other objects, features, and advantages of the present invention will become readily apparent from the following description, reference being made to the accompanying drawings in which.

SPECIFIC DESCRIPTION

Figure 2:
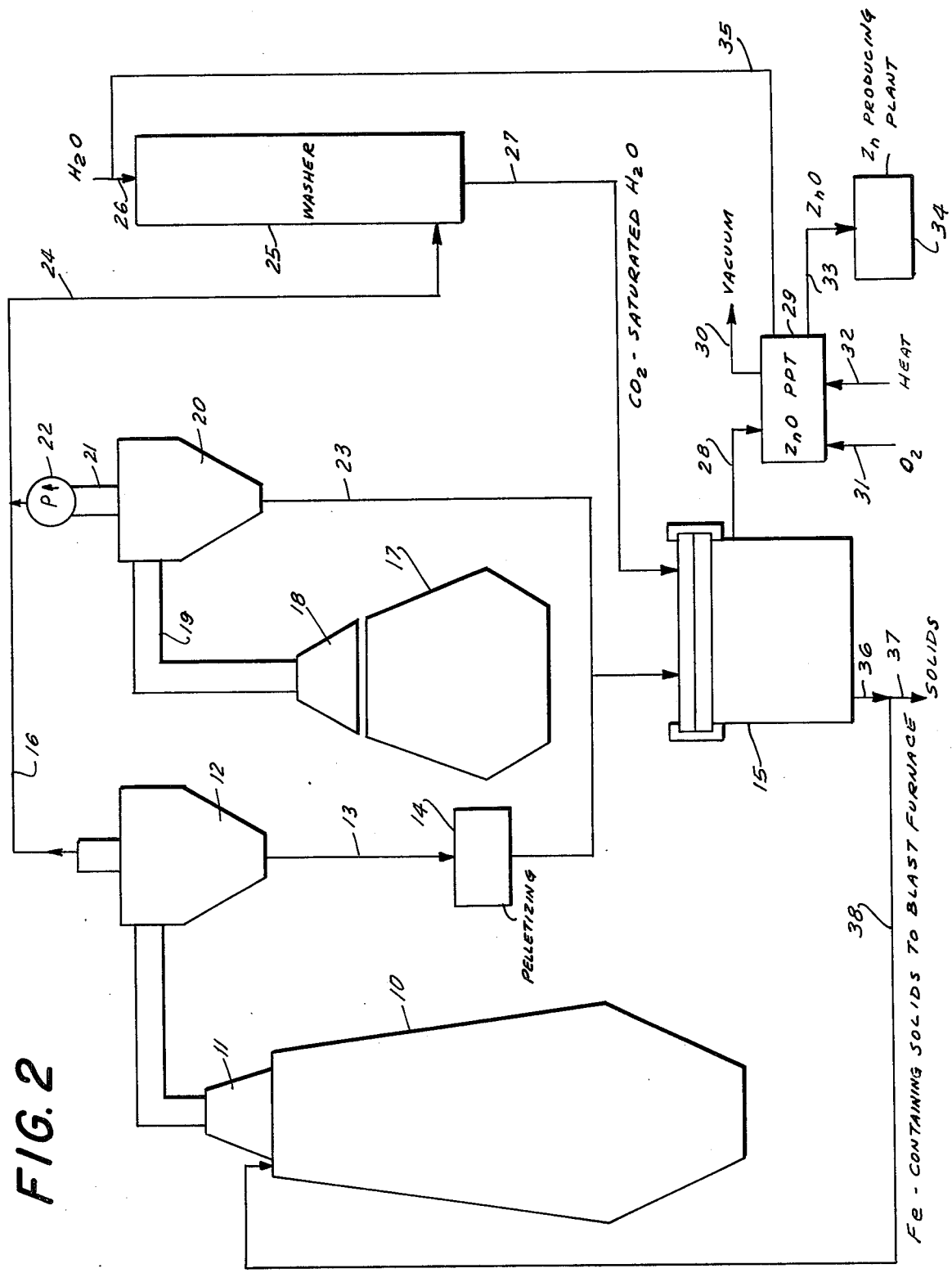
FIG. 2 is a flow diagram of a plant for carrying out the process of the present invention.

Referring first to FIG. 2 of the drawing, it will be apparent that the present process is applicable either to a blast furnace 10 or a steel-making converter 17 or both in a conventional ferrous metallurgy plant.

The blast furnace 10 is provided with the usual gas recovery hood 11 which can be connected to a cyclone 12 from which the dust can be removed from the gas. The zinc containing dust is led at 13 to a pelletizing stage 14 and the pellets are then introduced into an autoclave 15 which has previously been charged with water saturated with carbon dioxide and possibly containing sulfur dioxide.

Alternatively, or in addition, the gases from the converter 17 are recovered by a hood 18 and led by a duct 19 to a cyclone 20 in which the dust is separated from the gas, the latter being drawn through an outlet 21 by a blower 22.

The zinc containing dust is fed at 23 directly to the autoclave 15 or to the latter via a pelletizing stage as shown at 14.

The gases, freed from the dust, are led via ducts 16 and 21 to an inlet 24 of a washer or scrubber 25 which is supplied with water at 26. Since these gases contain large quantities of carbon dioxide and, possibly, sulfur dioxide, the water emerging at 27 is saturated in carbon dioxide. It has been found to be advantageous to carry out the washing in the tower 25 at the same pressure as is maintained in the autoclave 15.

Figure 1:
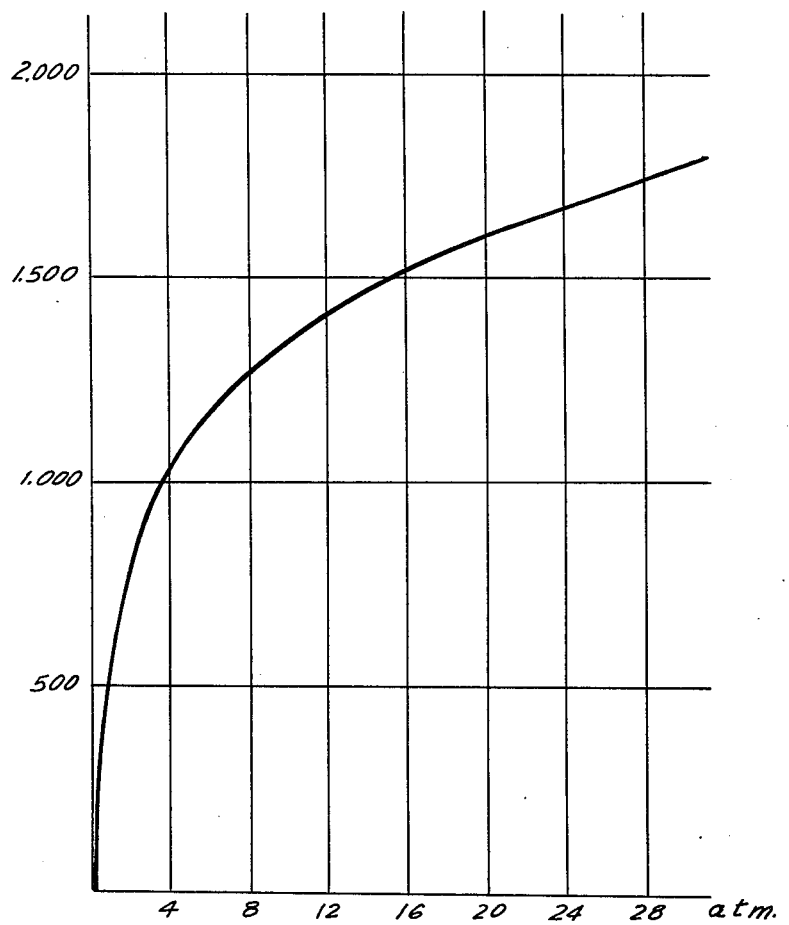
FIG. 1 is a graph representing the recovery of zinc as a function of pressure in the extraction vessel.

Referring briefly to FIG. 1, in this connection, it can be seen that as the pressure in the autoclave and hence the concentration of carbon dioxide in the solution increases, the recovery of zinc by the solution likewise increases. In FIG. 1 the zinc recovery in milligrams per liter of solution is plotted along the ordinate while the pressure in atmospheres is plotted along the abscissa.

Reverting to FIG. 2 of the drawing, it will be seen that the $CO_2$-saturated water is supplied to the autoclave as represented by the line 27.

The autoclave 15 can be agitated, e.g. rotated, and is maintained at the elevated pressure selected for recovery of the zinc.

The solution is decanted at 28 and after filtration or centrifugation, is delivered to a zinc oxide precipitating stage 29 in which it can be aerated as represented by arrow 31, can be heated as represented at 32 and can be evacuated as shown at 30, in combination or individually, to drive off the carbon dioxide. The resulting zinc oxide precipitate, recovered from the solution by filtration, centrifugation or decantation, as represented at 33, can be introduced into a zinc producing plant 34. The liquid phase, consisting primarily of water and any acids which may be added, are returned to the washer 25 as represented by line 35 as part of the water used for washing the gas.

The solids from which the extracting solution has been decanted at 28 are recovered at 36 and may either be discarded as shown at 37 or recycled as indicated at 38 to the blast furnace or, if desired, to the steel-making furnace.

SPECIFIC EXAMPLE

Dust from a blast furnace containing 3% by weight zinc is subjected to successive extractions at atmospheric pressure with a solution saturated with carbon dioxide and then is suspended in a solution saturated with carbon dioxide for a period of about 30 minutes at ambient temperature.

After seven successive extractions in which the water/dust ratio (by weight) was 10:1, it is found that more than 60% of the zinc contained in the dust is present in the aqueous phase. This removal of zinc can be increased by adding mineral acids during the extraction process. Sulfuric acid in concentration of 1%, for example, can positively effect the zinc recovery from the dust. Although agitation has been found to be desirable, it does not appear to have any material effect with respect to rate of agitation.

The zinc is recovered from the extraction solution filtered from the dust by blowing air into the solution for a period of five minutes. More than 99% by weight of the solubilized zinc is thereby precipitated as the zinc oxide. The zinc oxide is recovered from the solution by filtration and introduced into a zinc making plant. The solids from the autoclave are recycled to the furnace.

According to another example of the process, the dust recovered from a cyclone and separated from blast furnace gases is treated with an aqueous carbon dioxide solution under elevated pressure in an autoclave. The zinc content of the original dust is 3.1% by weight zinc. The ratio of dust to treating solution is 1:10. The pressure is 25 kg/cm$^2$ and the temperature of the extracting water is 20° C. The autoclave is rotated at 1000 rpm for a period of thirty minutes. 62% of the zinc is recovered in a single such treatment from the dust. The recovery of zinc from the water, by heating the same to drive out the carbon dioxide is approximately 100%. The dust was previously pelletized and the extracted pellets were then returned to the blast furnace. The zinc oxide recovered by precipitation was fed to a zinc producing plant.

The preferred pressure according to the invention is 15 to 40 atmospheres with best results being obtained at about 30 atmospheres. The alkaline substance can be added to complete the precipitation of zinc from the extracting solution or can be added at the outset of precipitation as desired.

We claim:
1. A process for recovery of zinc from the dust of a metallurgical plant which comprises the steps of:
    a. forming compacts of said dust;
    b. saturating water with carbon dioxide; to form a treating solution;
    c. treating the compacts of said dust with said water saturated with carbon dioxide for a period and at a temperature sufficient at a pressure of the order of

15 to 40 kg/cm² to solubilize zinc from the dust compacts in the water of the treating solution; and d. precipitating the zinc from said solution by eliminating carbon dioxide therefrom.

2. The process defined in claim 1 wherein the treating solution is saturated with carbon dioxide by solubilizing therein carbon dioxide from the gas of a metallurgical plant therein.

3. The process defined in claim 1 wherein said treating solution contains sulfur dioxide.

4. The process defined in claim 1, further comprising the step of adding a mineral acid to the treating solution used to treat said dust.

5. The process defined in claim 1 wherein said pressure is of the order of 30 kg/cm².

6. The process defined in claim 1 wherein the zinc is precipitated from said solution by aeration thereof.

7. The process defined in claim 1 wherein the zinc is separated from said solution by heating said solution to drive the carbon dioxide therefrom.

8. The process defined in claim 1 wherein the zinc is precipitated from said solution by subjecting said solution to vacuum to drive carbon dioxide therefrom.

9. The process defined in claim 1, further comprising the step of adding an alkaline substance to said solution for precipitation of zinc therefrom.

* * * * *